United States Patent [19]

Hart et al.

[11] 3,839,731

[45] Oct. 1, 1974

[54] APPARATUS FOR SENSING RELATIVE POSITION BEHIND HEAD AND TRACK IN TRANSVERSE MAGNETIC RECORDING WITHOUT A SEPARATE CONTROL TRACK

[75] Inventors: Gary A. Hart, Boulder; Ernest P. Kollar, Longmont; Otto R. Luhrs, Boulder, all of Colo.

[73] Assignee: International Business Machines Corporation, Armonk, N.Y.

[22] Filed: Dec. 1, 1972

[21] Appl. No.: 311,087

[52] U.S. Cl. .................................................. 360/72
[51] Int. Cl. .......................................... G11b 27/30
[58] Field of Search .............. 179/100.2 T, 100.2 S; 178/6.6 P

[56] References Cited

UNITED STATES PATENTS

| | | | |
|---|---|---|---|
| 3,369,082 | 2/1968 | Hibbard | 179/100.2 T |
| 3,549,797 | 12/1970 | Dann | 179/100.2 T |
| 3,666,897 | 12/1969 | Harr | 179/100.2 T |

*Primary Examiner*—Bernard Konick
*Assistant Examiner*—Robert S. Tupper
*Attorney, Agent, or Firm*—Homer L. Knearl

[57] ABSTRACT

When transverse or slant tracks are recorded on magnetic tape, control of the position of the transverse transducer relative to the transverse track is critical in reading out the information in the transverse tracks. This control has two facets—finding a predetermined slant track and aligning the transducer with the slant track. The transverse track position sensing system shown herein provides control signals for these two functions. The position sensing is accomplished by use of a fixed head positioned relative to the path of the transverse transducer. The fixed head scans an area of the magnetic tape where each transverse track ends. Signals from the fixed head are analyzed to determine the track end position of each slant or transverse track. This information is, in turn, operated on to derive tape movement control information for the purposes of finding a slant track and aligning the track with the path of the slant track head. For greater accuracy in alignment, a second fixed head is provided for monitoring the other end of the transverse track to determine the angle of the slant track relative to the path of the slant track head. If the angles are not the same, corrections may be made by adjusting tape movement.

11 Claims, 3 Drawing Figures

APPARATUS FOR SENSING RELATIVE POSITION BEHIND HEAD AND TRACK IN TRANSVERSE MAGNETIC RECORDING WITHOUT A SEPARATE CONTROL TRACK

BACKGROUND OF THE INVENTION

1. Field of the Invention

This invention relates to position sensing of slant tracks relative to transducers moving transverse to the direction of motion of magnetic tape. More particularly, this invention relates to sensing the ends of slant tracks with a transducer fixed at a predetermined position relative to the path of the slant track transducer. In addition, the track end information is analyzed to derive position information such as slant track address, angle between slant track on tape and the path of the slant track transducer, and alignment between slant track transducer and slant track.

2. History of the Art

A common problem in slant track or transverse track recording is the relative position control of the slant track head with the slant track. In the past this has typically been accomplished by use of longitudinal tracks at the edge of the magnetic tape which serve as control tracks. The control tracks are monitored for address and synchronization information. The address information is used to find a given slant track while synchronization information is used to control head speed, tape speed or both.

A good example of a system using a longitudinal track to position control a slant track head relative to a slant track recording is taught in commonly assigned U.S. Pat. No. 3,666,897, entitled "Recording and Reproducing System with Video Heads Reading Both Information Data from Oblique Tracks and Address Data from the Longitudinal Control Track." This invention by Mr. J. D. Harr teaches a longitudinal control track near the edge of a tape wherein record identification is written by a fixed head and the rotating or slant track head is used to read the record identification information in the longitudinal track. In addition, the Harr patent shows gaps between the record identification blocks in the longitudinal track. These gaps are detected by the rotating head and used to synchronize the head speed with the tape speed so as to align the rotating heads with the slant tracks.

Yet another track servoing technique in the slant track recording art which uses a longitudinal control track is shown and described in copending commonly assigned application Ser. No. 254669, filed May 18, 1972, entitled "Track Following System for Magnetic Tape Recorder." This invention of Mr. W. S. Buslik shows a longitudinal track recorded by a fixed head. The longitudinal track is made up of alternate patterns of magnetization with a transition from one magnetization state to the other state being aligned with the center of a slant track. The rotating head may then detect alignment with the transverse or slant track by detecting the transition in the longitudinal track.

While both of these longitudinal control track techniques work very well, it is desirable to eliminate a longitudinal control track for several reasons. First, such a control track does consume space on the tape. Second, for high slant track density (slant tracks less than 10 mils wide with no space between tracks) crowding control information into the longitudinal control track becomes a problem. Third, the cost of manufacturing or reading a tape with slant tracks can be reduced if the longitudinal track is eliminated. In other words, it is not necessary to provide write circuits to write a longitudinal track either during manufacture of the tape or at the tape drive. For at least the above reasons, it is desirable to be able to sense slant track position information without use of a longitudinal control track.

SUMMARY OF THE INVENTION

In accordance with this invention the longitudinal control track has been eliminated while preserving slant track position detection. This has been accomplished by providing a fixed transducer whose position is predetermined relative to the path of the transverse or slant track transducer. The fixed position transducer is positioned relative to the longitudinal movement of the tape so that it scans a predetermined area of the tape where slant track ends are expected. The fixed head detects the end of each slant track and generates a track end signal. The track end or track crossing signals are then analyzed to determine relative position between transverse tracks and the transducer for the transverse tracks. In other words, the position of slant track is known upon detection of the end of the slant track by the fixed head. Since the path of the transverse track transducer is predetermined relative to the fixed head, the position of the slant track relative to the slant track head is then known.

As a further feature of the invention the track ends are detected by envelope sensing the signal produced by the fixed head. Because the slant tracks are butted adjacent to each other, the slant track ends will form a sawtooth shaped envelope signal as read by the fixed head. The envelope signal can then be monitored to detect a peak or low point as indicating the position of the slant track relative to the fixed head and thus relative to the slant track head path.

As another feature of the invention, a second fixed head is positioned to scan the other predetermined area of the tape that should contain the other end of the slant track. The signal from the second fixed head is envelope sensed to detect the end-of-track position from the peak or null of the envelope-sensed signal. The two fixed heads are positioned such that, when the angle of the slant track is correct, the track end signals detected from each fixed head will occur simultaneously. Thus by detecting the time difference between the track end or track crossing signals produced by each fixed head, a measure of the departure of the slant track from a desired angle is achieved. The angle could then be changed by guiding the tape as it approaches the path of the slant track transducer.

As another feature of the invention, one of the fixed heads can be monitored to determine the address of the slant track. Slant track address can be detected by counting from the beginning of tape each track crossing as an end of track is encountered. Alternatively, the end of track could contain a preamble recorded by the slant track transducer. This preamble would contain the address identification for that slant track. The fixed head would scan the preamble portion of the slant track as the tape moves past the fixed head and identify each slant track by address.

The great advantage of this invention is that it does not require a longitudinal control track to detect the position of slant tracks and to generate control signals for address information or servoing information. Thus the cost of equipment working with the slant track tapes recorded in accordance with this invention is much less. In addition, track density can be increased with no adverse effect on position control functions. Of course, because of the elimination of a longitudinal track, there is additional space available to lengthen the slant tracks as they move across the width of the tape.

The foregoing features and advantages of the invention will be apparent from the following more particular description of preferred embodiments of the invention as illustrated in the accompanying drawings.

DESCRIPTION OF PREFERRED EMBODIMENTS

Figure 1:
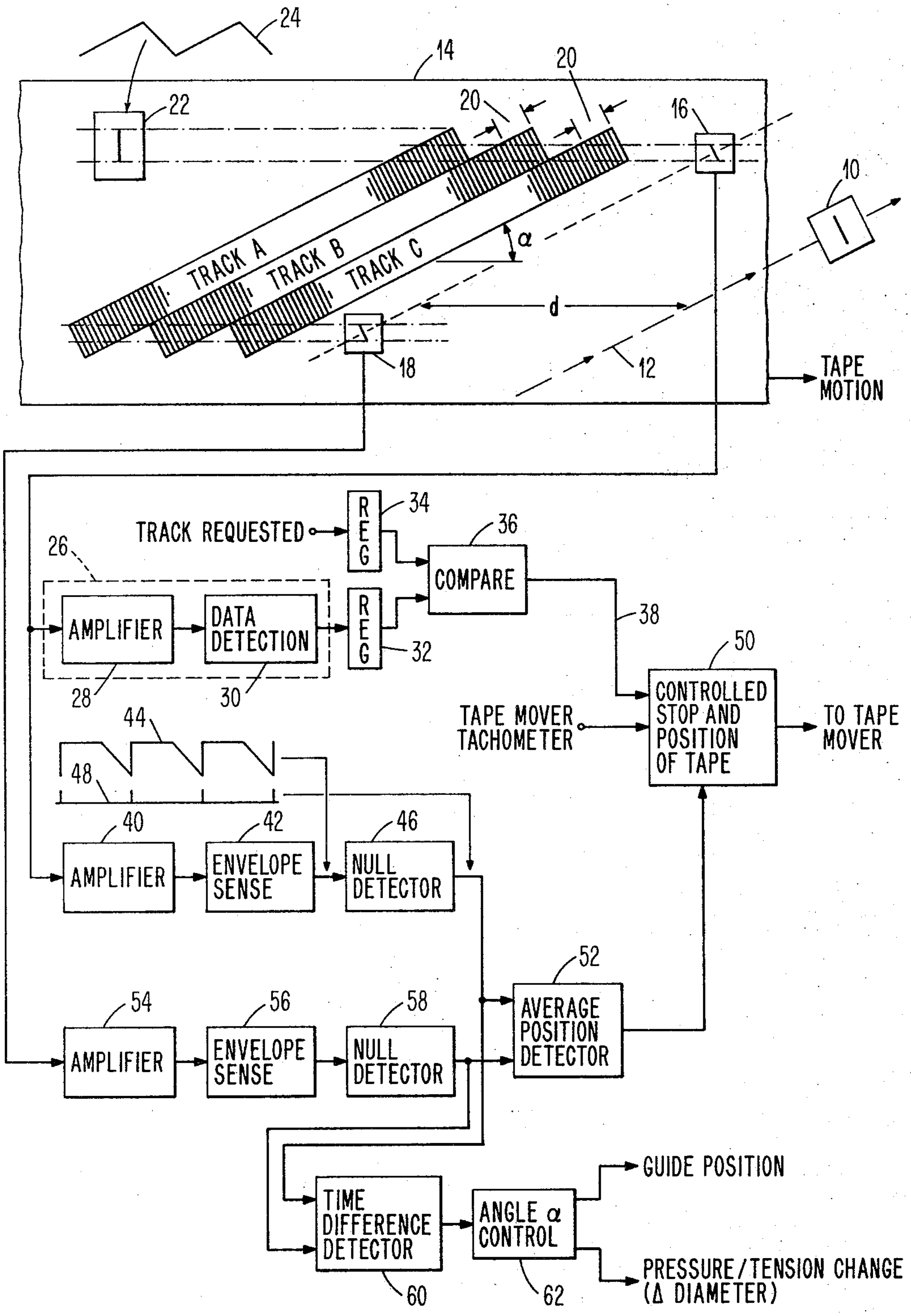
FIG. 1 shows the preferred embodiment of the invention wherein there are fixed heads for detecting the track ends along with the analysis electronics for generating control signals from the track end signals.

In FIG. 1 a schematic block diagram of a preferred embodiment of the complete position sensing system is shown. For simplicity of explanation the tape has been shown straightened out as opposed to being wrapped about a rotating head. The effective path of the rotating head 10 is indicated by the arrows 12 moving across the tape 14. Tape motion is from left to right. To the left of the path 12 of the rotating head, the fixed heads 16 and 18 are positioned. Fixed heads 16 and 18 are a predetermined distance "*d*" from the path 12 of the rotating head 10. Three transverse tracks A, B, and C are shown on the tape. These tracks are layed down by the rotating head 10. Thus the tracks A, B and C are parallel to the path 12 of the rotating head 10 and have an angle "$\alpha$" relative to the longitudinal motion of the tape 14.

As the tape 14 moves past the heads 16 and 18 the heads will generate a data signal which is the information in the end areas 20 of the transverse tracks. Note that the gap of the heads 16 and 18 is oriented at the same angle as the gap of the rotating head 10. Thus the gap in the fixed heads 16 and 18 will be aligned to read the transitions layed down by the rotating head at the end of the transverse tracks. The signal produced by the fixed heads contains data fluctuations amplitude modulated by the shape of the end of the transverse track.

Of course as an alternative the fixed heads 16 and 18 might be similar to the head 22, which is large enough to read the entire end portion of each transverse track as opposed to the smaller portion 20. Also, as an alternative the gaps of the fixed heads may be oriented perpendicular to the longitudinal motion of the tape if the angle "$\alpha$" that the transverse tracks make with the longitudinal motion of the tape is not too high. Of course as the angle between data bits in the transverse tracks increases relative to the orientation of the gap in the fixed heads, the signal in the fixed head would deteriorate. Waveform 24 associated with the fixed head 22 is the envelope of the signal that would be picked up by heads such as fixed head 22 as it scanned across entire track ends of transverse tracks.

The analysis or interpretation of the signals from fixed heads 16 and 18 is accomplished by the apparatus shown below the tape in FIG. 1. The signal from fixed head 16 is used for the purpose of address identification and for transverse track servo information.

Address detection is accomplished by apparatus within dashed lines 26. Amplifier 28 amplifies the signal from the head 16 and passes it to the data detection circuits 30. The data detection circuits 30 may be implemented to operate in accordance with NRZI code, PE (Phase Encoded) code, or any other magnetic recording code. The data detection circuits 30 would be designed in accordance with the code by which data is written in the transverse tracks.

If the rotating head were to write a preamble specifying an address for each transverse track at the area 20 at the end of the track, then the fixed head 16 would transduce the address, the data detection circuits 30 would decode the address, and the address would be loaded into register 32. The address of the track requested would be loaded into register 34 by a data processing system to which the tape drive is attached. The address of the track requested would then be compared by comparator 36 with the address of the track whose track end was just scanned by the fixed head 16. If there is a compare equal, then the comparator 36 generates a search ended signal on line 38. An alternative address detector 26 which utilizes a counter will be discussed later with reference to FIG. 3.

In FIG. 1 the signal from the fixed head 16 is also passed to the amplifier 40 which amplifies the signal from the head and passes the signal on to the envelope sense circuit 42. The output of the envelope sense circuit is the waveform 44 which indicates the amplitude of the signal detected by the fixed head 16 as it scans across the track ends of the transverse tracks. Null detector 46 then detects the low point in the envelope sense waveform and generates the pulse waveform 48.

Figure 2:
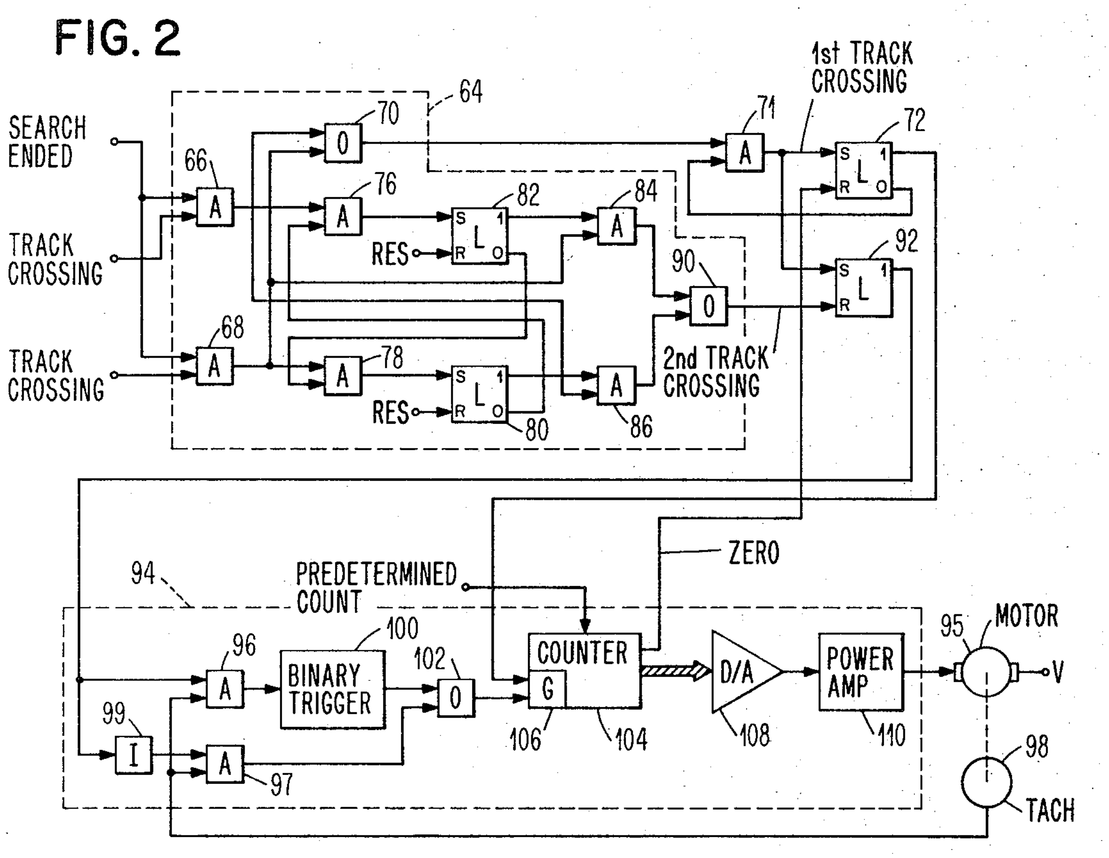
FIG. 2 shows the logic for tape motion control referred to in FIG. 1.

The pulses 48 which indicate each track crossing are passed to the average position detector 52. The control 50 and average position detector 52 are shown in FIG. 2 and will be described in more detail thereof. In essence these blocks interpret the search ended signal over line 38 and the track crossing pulses from null detectors 46 and 58. As a result of analysis of this information, the tape is moved to a point where the path of the rotating head is aligned with the track requested by the address loaded into register 34.

To detect non-parallelism between the transverse tracks and the path of the rotating head, the signal from fixed head 18 must be monitored to detect track crossings. Fixed head 18 is monitored by the amplifier 54, envelope sense 56, and null detector 58, which operates in exactly the same manner as amplifier 40, envelope sense 42, and null detector 46 respectively. The track crossing pulses from null detector 58 correspond to the track crossings picked up by fixed head 18.

The average position detector 52 receives track crossing pulses from both null detector 46 and null detector 58. Detector 52 then cooperates with the control 50 to center the path of the rotating head on the address track when the tracks are not exactly parallel to the path of the rotating head. The average position detector compensates for such non-parallelism by centering the path of the rotating head between the two track crossing positions detected by the heads 16 and 18.

The track crossing pulses from null detector 46 (head 16) and from null detector 58 (head 18) are also applied to a time difference detector 60. Time difference detector 60 measures the time difference between the two track crossing pulses from head 16 and head 18 and also detects the direction of that time difference. Based on this information, the time difference detector generates an error signal indicating the angle of skew of the transverse track from the nominal or desired direction.

The fixed heads 16 and 18 are positioned such that they effectively form a transverse line across the tape which is parallel to the path of the rotating head. Thus the time difference detector 60 by monitoring the track crossing pulses can detect the skew of transverse tracks relative to the path of the rotating head. The error signal out of the time difference detector 60 is then a measure of the transverse track skew relative to the path of the rotating head. The error signal is utilized by the angle "$\alpha$" control 62 to adjust the guidance of tape 14. As the guides do not form a part of the invention, they are not shown. Some guides that might be used would be edge guides to guide a tape wrapped about a mandrel. Alternatively, if the mandrel is air bearing adjustments to the pressure of the air bearing and tension on the tape can also change the path of the tape.

As described above, the fixed heads 16 and 18 are positioned in a line so that they monitor track ends of the same transverse track. As an alternative, it might be desirable to position the fixed heads 16 and 18 so that they monitor track ends of different transverse tracks. So long as all transverse tracks are parallel, the same information would still be available to the tape position system of FIG. 1 On the other hand, the most exact and most desirable system appears to be mounting the fixed heads 16 and 18 so that they monitor the track ends of the same transverse track.

Now referring to FIG. 2, the tape position control 50 and the average position detector 52 are shown in detail. The input signals to the logic in FIG. 2 are the "search ended" signal (line 38, FIG. 1) and the track crossing pulses from null detectors 46 and 58 of FIG. 1. Logic 64 monitors these three input signals to generate a first track crossing and a second track crossing pulse that occurs after comparator 36 (FIG. 1) has indicated that the search is ended.

The search ended signal enables AND gates 66 and 68 in FIG. 2 to monitor null detectors 46 and 58 of FIG. 1 for track crossing pulses. Because the tape continues to move, the search ended signal will be present only until the track address of the next track has been read. During this interval of the "search ended" signal, one track crossing will be detected by each of the heads 16 and 18.

OR circuit 70 monitors the output of AND's 66 and 68 and collects the track pulses passed by these AND gates. The first track pulses passed by OR 70 sets latch 72 via AND gate 71 which is conditioned by the reset side of latch 72. Thus, latch 72 is set by the first track crossing pulse that occurs after the search ended signal comes up. The second track crossing pulse is blocked from latch 72 because AND gate 71 is then inhibited by latch 72.

To detect the second track crossing pulse, AND gates 76 and 78 monitor AND gates 66 and 68 respectively. AND gate 76 is conditioned by a reset condition in latch 80 while AND gate 78 is conditioned by reset condition in latch 82. Latches 80 and 82 are reset when a new track is requested.

With both AND gates 76 and 78 enabled, the first track crossing pulse that hits AND gate 66 or 68 when the "search ended" signal is present will be passed through the associated AND gate to set latch 80 or 82. In other words, if the first track crossing pulse occurs at the input to AND gate 66, it will be passed by AND gate 76 to set latch 82. When latch 82 is set, AND gate 78 is then inhibited so that latch 80 will not be set by the second track crossing pulse. The set condition in latch 82 enables AND gate 84. Thus, when the second tracking pulse occurs at AND 68, it is passed by AND 84 to OR circuit 90. OR circuit 90 has an output that corresponds to the occurrence of second track crossing pulse during a "search ended" condition. Of course, if the first track crossing pulse had occurred at AND 68, then latch 80 would have been set enabling AND gate 86 to pass the second track crossing pulse to OR 90 from AND gate 66.

Latch 92 which monitors the first track crossing pulse from AND 71 and the second track crossing pulse from OR 90 has an output whose duration equals the time difference between the first track crossing pulse and the second track crossing pulse. This time difference signal from latch 92 is passed to the tape motor control logic 94.

In the preferred embodiment the tape is not moved continuously, but is moved incrementally from track to track. Thus the problem of servoing the rotating head relative to the transverse tracks relates more to tape positioning rather than synchronous movement of the rotating head with the tape. Input to the motor control circuitry 94 consists of a predetermined count and pulses from a tachometer attached to the shaft of the motor. The motor is a DC motor.

The signal from latch 92 is used to enable AND gate 96. AND gate 96 then passes pulses from tachometer 98 to binary trigger 100. Binary trigger 100 operates to divide the tach pulses by two. In other words, for every two tach pulses hitting the binary trigger 100, the trigger has one output pulse. The output pulse from trigger 100 is passed by OR 102 to the counter 104. The counter contains a gate 106 which must be enabled by the signal from latch 72. The tachometer pulses passed by OR 102 to the counter 104 operate to count the counter down to zero. When the counter reaches zero a signal is passed back to reset latch 72.

While there is a count in the counter the digital to analog converter 108 generates an analog signal which is amplified by amplifier 110. The amplified signal is then used to drive the DC motor 95.

The average position detection function is accomplished by the cooperation of AND gates 96 and 97 with binary trigger 100 and OR circuit 102. The difference in time between the first track crossing and the second track crossing is the signal received at AND gate 96 from latch 92. The signal from latch 92 is also inverted and applied to AND gate 97. Thus when the time difference signal is present, AND gate 96 is enabled and AND gate 97 is inhibited. Conversely, after the time difference has expired, AND gate 96 is inhibited and AND gate 97 is enabled.

In effect, during the interval of time difference the tach pulses from tach 98 are passed by AND 96 to binary trigger 100. Binary trigger divides the tach pulses by two and applies them to the OR 102. After the time difference interval has expired, AND gate 97 passes the tach pulses directly to OR 102.

In operation at the time a track is requested and the track address is loaded into register 34, a central control also loads the predetermined count into counter 104. This predetermined count would represent the distance "*d*" in FIG. 1 between the fixed heads and the path of the rotating head. The count, of course also, depends upon the number of pulses put out by the tachometer 98 for the complete crossing of a track end by the fixed heads. As a typical example, the tachometer 98 might put out 50 pulses while the tape moves one track end past the fixed head 16 or 18.

With the predetermined count in the counter 104, the digital to analog converter will have a strong output signal which will be amplified to drive the motor 95. The tape moves forward and compare 36 in FIG. 1 begins to monitor track end addresses to detect the track requested. When the track requested is found, the search ended signal comes up and logic 64 in FIG. 2 generates a first track crossing pulse to set latch 72 and latch 92 and a second track crossing pulse to reset latch 92.

When latches 72 and 92 are set, the tachometer pulses are passed through binary trigger 100 and used to count down in counter 104 at half rate. In other words, for each two tachometer pulses, the counter 104 is counted down once. When the time difference between the track crossing pulses expires and latch 92 is reset, then the tachometer pulses are passed via AND gate 97 directly to the counter 104. The counter 104 is then counted down at the full rate of one countdown for each tach pulse.

When the counter 104 has been counted down to zero, the digital to analog converter will no longer have an output signal. The DC drive to the motor 95 stops and the motor stops. At this point, the requested track will be aligned with the path of the rotating head.

The existence of zero count in the counter 104 means that the tape has moved the necessary distance "*d*" in FIG. 1 to bring the address track to the path of the rotating head. The zero count in counter 104 of FIG. 2 is also used to reset the latch 72. With latch 72 reset, no inadvertent pulses will be passed via gate 106 to the counter, and in addition, the control apparatus of FIG. 2 is ready to move the tape to the next requested track.

Figure 3:
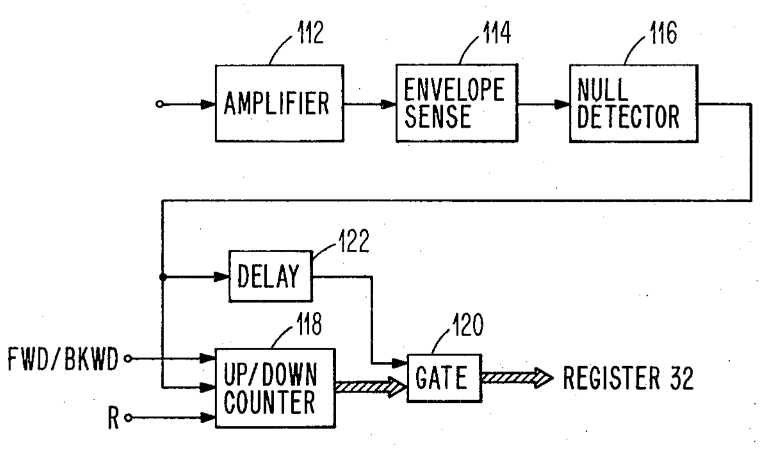
FIG. 3 shows an alternative address detection technique utilizing a counter.

Now referring to FIG. 3, the alternative address detection apparatus for area 26 of FIG. 1 is shown. Recall that the address detection apparatus in FIG. 1 actually read address identification information in the track ends. As an alternative, in FIG. 3 address detection consists of counting track ends or track crossings.

To detect track crossings for address detection, an amplifier 112, envelope sense 114 and a null detector 116 are provided. These devices operate in exactly the same manner as amplifier 40, envelope sense 42 and null detector 46 as previously described with reference to FIG. 1. In other words, the null detector 116 will have an output pulse each time the low point in the envelope signal 44 of FIG. 1 occurs.

The track crossing pulses from null detector 116 are passed to an up/down counter 118. Counter 118 receives two additional control signals. One control signal is a forward/backward control to indicate to the counter whether the tape is being addressed in the forward or backward direction. The other control signal is a reset signal which resets the counter to zero at the beginning of tape. Thus when the tape is loaded, the counter is reset to zero and begins to count up as track ends are crossed. If the direction of tape is reversed, the up/down counter is switched to count down and the counter counts down as each track end is crossed.

The track crossing pulses are also passed to gate 120 via delay 122. The delay 122 is a short-time-delay which allows the counter 118 to settle to its new count before the count is gated through gate 120.

Placing the address detection apparatus of FIG. 3 into FIG. 1, area 26, the search function would operate as follows. The count of the track requested would be loaded into register 34. In addition, the control apparatus would identify to counter 118 whether tha tape will be moving in the forward or backward direction. The tape begins to move and the track crossing pulses from null detector 116 advance the counter 118 up or down depending upon the direction of motion.

Between each track crossing pulse delay 122 would pass the delayed track-crossing pulse to gate 120. Gate 120 would then pass the count from counter 118 to register 32 of FIG. 1. Comparator 36 of FIG. 1 makes the comparison to determine whether the search for the track had ended.

One additional observation with regard to this alternative address detection scheme is that the predetermined count utilized in counter 104 of FIG. 2 will be different for the two address detection schemes; i.e., reading address identification versus counting track crossings. In the case of reading address from the track ends, the address is read and the track crossing is detected from the same track end signal. This can be seen from waveform 44 in FIG. 1 wherein the flat portion of the envelope corresponds to the area of the signal containing address identification information while the null corresponds to the point at which track crossings are identified. Thus it can be seen that in the same track end signal, track crossing and record identification information are available.

On the other hand, when track crossings are used to both identify address and provide servo position information, then two track end cycles or two track crossing pulses will be required. The first track crossing pulses will be utilized by the apparatus in FIG. 3 to advance the counter 118. While the count in counter 118 is being compared in comparator 36 of FIG. 1 to see if search is ended, the tape will continue to move. If the search is complete, then the next track crossing pulse can be used with the logic of FIG. 2.

The logic of FIG. 2 responds to track crossing pulses in the next track end immediately after the track end that resulted in the search ended signal. Thus the predetermined count in counter 104 would have to be a count which specifies the distance from the track crossing of the track end immediately after the requested track. Therefore, the predetermined count in counter 104 for the counter address detection technique will be less than the predetermined count in counter 104 for the address read technique.

While the invention has been particularly shown and described with reference to preferred embodiments thereof, it will be understood by those skilled in the art that various changes in form and detail may be made therein without departing from the spirit and scope of the invention.

What is claimed is:

1. In a recording system where a plurality of information tracks are recorded at an angle other than zero degrees relative to the longitudinal motion of the storage medium by a transducer moving transversely across the medium at said angle, apparatus for positioning a predetermined transverse track at said transverse transducer comprising:

fixed means for scanning the ends of said transverse tracks as the medium moves past said fixed scanning means and generating a transverse track end signal derived from each passing track end said fixed scanning means being located a predetermined longitudinal distance from the path of said transverse transducer;

first means connected to said fixed scanning means for interpreting said end signals and generating therefrom address signals indicative of the address of each of said transverse tracks second means connected to said first means for comparing each generated address with the address of said predetermined track and generating a search ended signal upon detection of a compare equal condition;

third means responsive to said search ended signal and said track end signals for moving the tape said predetermined distance whereby said predetermined track is positioned at said transverse transducer.

2. The apparatus of claim 1 wherein said third means includes:

means for envelope sensing the track end signals generated by said fixed scanning means;

means for detecting discontinuity in said envelope signal, that occurs as each track end is sensed, and generating a track position signal indicating the distance of said predetermined transverse track from the path of said transverse transducer.

3. The apparatus of claim 2 wherein said first means includes;

means for counting said track end signals to identify the address of each of said transverse tracks.

4. The apparatus of claim 3 wherein said first means further includes;

means for comparing the count in said counting means with a track requested count and generating said search ended signal upon said compare equal condition, said search ended signal indicating the track end of said predetermined transverse track requested has been scanned by said fixed scanning means.

5. The apparatus of claim 1 and in addition;

second fixed means for scanning the ends of said transverse tracks opposite from those ends scanned by the first fixed scanning means as the medium moves past said second fixed scanning means and generating a second, transverse-track end signal derived from each passing track end;

said second scanning means being located a predetermined longitudinal distance from the path of said transverse transducer;

fourth means receiving the first transverse-track end signal and the second transverse-track end signal for interpreting both transverse-track end signals and generating control signals indicative of skew of each of said transverse tracks relative to path of said transverse transducer.

6. The apparatus of claim 5 wherein said fourth means includes:

means for detecting the time difference between the first and second track end signals and generating an error signal indicative of the angular misalignment of each of said transverse tracks relative to the path of the transverse transducer;

means receiving said error signal for generating guidance control signals indicative of the position adjustment required of the medium to bring each of said transverse tracks parallel to the path of the transverse transducer.

7. The apparatus of claim 1 wherein said first means includes:

means for decoding data in the track end signal, said data being recorded in the end of each transverse track and being transduced by said fixed scanning means as said fixed scanning means crosses each track end.

8. The apparatus of claim 7 wherein said first means further includes;

means for comparing track requested data with the decoded data from said decoding means and generating said search ended signal upon said compare equal condition, said search ended signal indicating the track end of said predetermined transverse track requested has been located by said fixed scanning means.

9. Apparatus for generating tape position control signals for a slant track magnetic tape recorder, the tape position control signals indicating distance from a predetermined addressed slant track to the path of the slant track transducer, said generating apparatus comprising:

a fixed position transducer a predetermined distance from the path of the slant track transducer, said fixed transducer scanning the length of the magnetic tape at a lateral position on the tape where the ends of slant tracks are located;

said fixed transducer generating track crossing signals containing slant track address data transduced from the end of each slant track and amplitude modulated by the shape of the slant track end moving past said fixed transducer;

detecting means for detecting the address data in the track crossing signal;

comparing means connected to said detecting means for comparing the address in the track crossing signal with said predetermined address and generating a compare equal signal indicating the slant track having an address matching the predetermined address is presently positioned adjacent said fixed transducer;

sensing means connected to said fixed transducer and responsive to the amplitude modulation in each track crossing signal for sensing the passing of each slant track;

means responsive to said compare equal signal and said sensing means for generating a tape motion control signal indicating said predetermined addressed slant track adjacent said fixed transducer is a predetermined distance from the path of the slant track transducer.

10. The apparatus of claim 9 and in addition:

a second fixed transducer predeterminedly positioned relative to the path of the slant track transducer, said second fixed transducer reading recordings corresponding to the track ends opposite to the track ends read by the first fixed transducer;

said second fixed transducer generating opposite end track crossing signals containing slant track data amplitude modulated by the shape of the slant track end moving past said second fixed transducer;

means connected to both said first and second fixed transducers and responsive to the amplitude modulation in both track crossing signals for indicating the angle of each slant track relative to the path of the slant track transducer.

11. The apparatus of claim 9 and in addition:

a second fixed transducer predeterminedly positioned relative to the path of the slant track transducer, said second fixed transducer reading recordings corresponding to the track ends opposite to the track ends read by the first fixed transducer;

said second fixed transducer generating opposite end track crossing signals containing slant track data amplitude modulated by the shape of the slant track end moving past said second fixed transducer;

means connected to both said first and second fixed transducers and responsive to the amplitude modulation in both track crossing signals for indicating the average distance from said predetermined addressed slant track to the path of the slant track transducer.

* * * * *

PO-1050
(5/69)

UNITED STATES PATENT OFFICE
CERTIFICATE OF CORRECTION

Patent No. 3,839,731 Dated October 1, 1974

Inventor(s) GARY A. HART ET AL

It is certified that error appears in the above-identified patent and that said Letters Patent are hereby corrected as shown below:

In the title, on the cover page at [54] and at Column 1, line 2, change the word "BEHIND" to --BETWEEN--.

Signed and sealed this 3rd day of December 1974.

(SEAL)
Attest:

McCOY M. GIBSON JR.
Attesting Officer

C. MARSHALL DANN
Commissioner of Patents